US012559594B2

(12) United States Patent
Kawakami

(10) Patent No.: US 12,559,594 B2
(45) Date of Patent: Feb. 24, 2026

(54) CURABLE COMPOSITION, CURED PRODUCT AND COVERED SUBSTRATE

(71) Applicant: Shin-Etsu Chemical Co., Ltd., Tokyo (JP)

(72) Inventor: Masato Kawakami, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 726 days.

(21) Appl. No.: 17/948,913

(22) Filed: Sep. 20, 2022

(65) Prior Publication Data

US 2023/0105015 A1 Apr. 6, 2023

(30) Foreign Application Priority Data

Sep. 29, 2021 (JP) ................................ 2021-158826

(51) Int. Cl.
*C08G 77/388* (2006.01)
*C09D 183/08* (2006.01)

(52) U.S. Cl.
CPC ......... *C08G 77/388* (2013.01); *C09D 183/08* (2013.01)

(58) Field of Classification Search
None
See application file for complete search history.

(56) References Cited

U.S. PATENT DOCUMENTS 3,146,250 A * 8/1964 Speier .................. C07F 7/0874 556/412
3,175,993 A * 3/1965 Weyenberg ............ C08G 77/50 528/901
4,111,890 A * 9/1978 Getson ................. C08K 5/0091 428/447

FOREIGN PATENT DOCUMENTS

CN 101864173 A 10/2010
CN 102268234 A 12/2011
(Continued)

OTHER PUBLICATIONS

Japanese Office Action for Japanese Application No. 2021-158826, dated Jul. 2, 2024, with an English translation.

*Primary Examiner* — Randy P Gulakowski
*Assistant Examiner* — Holley Grace Hester
(74) *Attorney, Agent, or Firm* — Birch, Stewart, Kolasch & Birch, LLP

(57) ABSTRACT

A curable composition containing an alkoxysilylalkylaminopropyl-modified polysiloxane compound of the following general formula (1) and a hydrolyzable group-containing organosilicon compound:

(1)

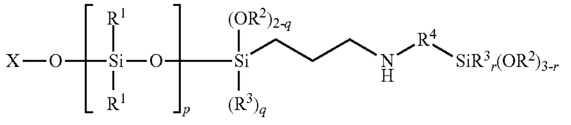

wherein $R^1$s each independently represent a substituted or unsubstituted monovalent hydrocarbon group having 1 to 10 carbon atoms, $R^2$ and $R^3$ each independently represent an unsubstituted monovalent hydrocarbon group having 1 to 6 carbon atoms, $R^4$ represents a divalent hydrocarbon group having 1 to 20 carbon atoms, which may contain a sulfur atom, a silicon atom, an ester bond or a urea bond, p is an integer of 1 to 1000, q is 0 or 1, r is 0, 1 or 2, and X represents a group of the following general formula (2) or $R^1{}_3Si$:

(Continued)

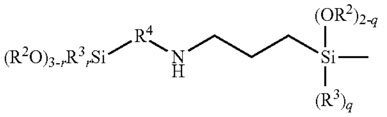

(2)

wherein $R^2$ to $R^4$, q and r represent the same meaning as described above.

10 Claims, 6 Drawing Sheets

(56) References Cited

FOREIGN PATENT DOCUMENTS

| | | | |
|---|---|---|---|
| JP | 9-319075 | A | 12/1997 |
| JP | 2007-145900 | A | 6/2007 |
| JP | 2007-177032 | A | 7/2007 |
| JP | 2008-75021 | A | 4/2008 |
| JP | 2013-129772 | A | 7/2013 |
| JP | 2013-227560 | A | 11/2013 |
| JP | 2014-139301 | A | 7/2014 |
| JP | 2014-218558 | A | 11/2014 |
| WO | WO 2007/061846 | A2 | 5/2007 |
| WO | WO 2021/133621 | A1 | 7/2021 |
| WO | WO 2021/1 56055 | A1 | 8/2021 |

* cited by examiner

CURABLE COMPOSITION, CURED PRODUCT AND COVERED SUBSTRATE

CROSS-REFERENCE TO RELATED APPLICATION

This non-provisional application claims priority under 35 U.S.C. § 119(a) on Patent Application No. 2021-158826 filed in Japan on Sep. 29, 2021, the entire contents of which are hereby incorporated by reference.

TECHNICAL FIELD

The present invention relates to a curable composition, a cured product and a covered substrate, and more particularly to a curable composition containing an alkoxysilylalkylaminopropyl-modified polysiloxane compound and a hydrolyzable group-containing organosilicon compound, a cured product, and a covered substrate.

BACKGROUND ART

An aminoalkyl-modified polysiloxane compound (hereinafter, also referred to as "amino-modified silicone") is used in various applications such as resin modifiers, fiber treatment agents, cosmetic raw materials and additives for coating materials with the utilization of the reactivity of amino groups.

Amino-modified silicone has a polysiloxane structure, and therefore exhibits a water-repellent property and flexibility. Thus, for example, when amino-modified silicone is used as a resin modifier or the like, a modified resin is obtained by reacting the amino-modified resin with an epoxy resin or an isocyanate resin which is a resin having a functional group capable of reacting with an amino group. In this way, a water-repellent property and flexibility derived from the polysiloxane structure of amino-modified silicone can be imparted to a resin.

In addition, a coating agent for vehicles has been developed which includes a silicone oligomer, silicone amino-modified at both terminals, a curing catalyst and a solvent. This coating agent is capable of imparting a high water-repellent property to a coating target due to the effect of silicone amino-modified at both terminals (Patent Document 1).

Further, a coating agent including a polysilazane compound, silicone amino-modified at both terminals and a solvent has been developed. This coating agent is also capable of imparting a high water-repellent property to a coating target due to the effect of silicone amino-modified at both terminals (Patent Document 2).

CITATION LIST

Patent Document 1: JP-A 2008-075021
Patent Document 2: JP-A 2014-139301

SUMMARY OF THE INVENTION

In the coating agents described in Patent Documents 1 and 2, amino-modified silicone that serves to impart a water-repellent property does not have a hydrolyzable silyl group in the molecule. Thus, there is a problem that when an attempt is made to form a cured film by mixing with a hydrolyzable group-containing organosilicon compound such as a silicone oligomer or a polysilazane compound, a film cannot be formed or it takes time to form a film.

The present invention has been made in view of the above-described circumstances, and an object of the present invention is to provide a curable composition capable of forming a cured film with the obtained film exhibiting a high water-repellent property derived from amino-modified silicone, a cured product obtained by curing the curable composition, and a covered substrate including a covering formed from the curable composition.

The present inventor has extensively conducted studies for solving the above-described problems, and resultantly found that a curable composition containing an alkoxysilylaminoalkyl-modified polysiloxane compound and a hydrolyzable group-containing organosilicon compound such as a silicone oligomer or a polysilazane compound is capable of forming a cured film in a short time, and the obtained film exhibits good water-repellent property, leading to completion of the present invention.

That is, the present invention provides:

1. A curable composition including an alkoxysilylalkylaminopropyl-modified polysiloxane compound of the following general formula (1) and a hydrolyzable group-containing organosilicon compound:

(1)

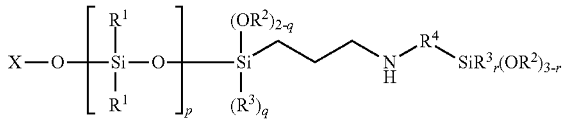

wherein $R^1$s each independently represent a substituted or unsubstituted monovalent hydrocarbon group having 1 to 10 carbon atoms, $R^2$ and $R^3$ each independently represent an unsubstituted monovalent hydrocarbon group having 1 to 6 carbon atoms, $R^4$ represents a divalent hydrocarbon group having 1 to 20 carbon atoms, which may contain a sulfur atom, a silicon atom, an ester bond or a urea bond, p is an integer of 1 to 1000, q is 0 or 1, r is 0, 1 or 2, and X represents a group of the following general formula (2) or $R'_3Si$:

(2)

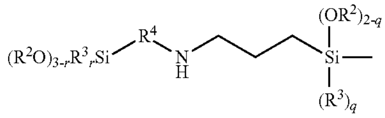

wherein $R^2$ to $R^4$, q and r represent the same meaning as described above;

2. The curable composition according to 1, wherein the hydrolyzable group-containing organosilicon compound is at least one selected from the group consisting of an alkoxysilane, a partial hydrolytic condensate of an alkoxysilane, a polysilazane and a polysiloxazane;
3. The curable composition according to 1 or 2, including a solvent;
4. The curable composition according to any one of 1 to 3, including at least one metal compound selected from the group consisting of a titanium compound, an aluminum compound, a zinc compound and a tin compound;
5. A cured product of the curable composition according to any one of 1 to 4; and 6. A covered substrate including a substrate, and a film formed on the substrate, the film being formed from the curable composition according to any one of 1 to 4.

Advantageous Effects of the Invention

The curable composition of the present invention can be subjected to co-hydrolytic condensation with a hydrolyzable group-containing organosilicon compound, so that a cured film can be rapidly formed. The obtained cured film exhibits a high water-repellent property derived from a polysiloxane structure.

DESCRIPTION OF THE PREFERRED EMBODIMENT

Figure 1:
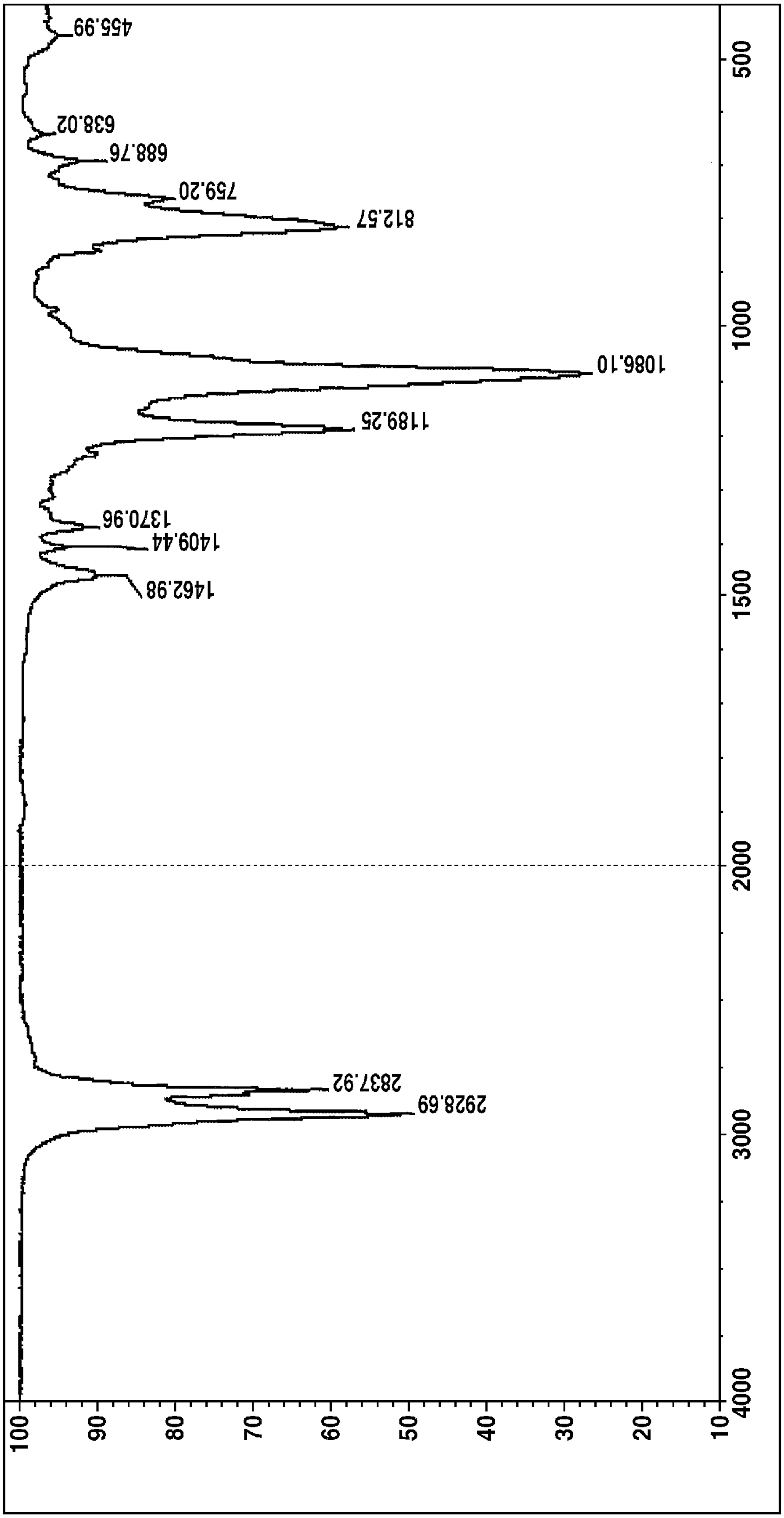
FIG. 1 is a diagram showing an IR spectrum of 2,2-dimethoxy-N-(trimethoxysilyloctyl)-1-aza-2-silacyclopentane obtained in Production Example 1.

Hereinafter, the present invention is described in detail.

[1] Curable Composition

The curable composition of the present invention contains an alkoxysilylalkylaminopropyl-modified polysiloxane compound of the following general formula (1) (hereinafter, referred to as a "compound (1)") and a hydrolyzable group-containing organosilicon compound.

(1)

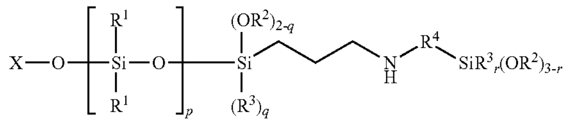

In the general formula (1), $R^1$s are each independently a substituted or unsubstituted monovalent hydrocarbon group having 1 to 10, preferably 1 to 6, more preferably 1 to 3 carbon atoms.

The monovalent hydrocarbon groups of $R^1$ may be linear, branched or cyclic, and specific examples thereof include linear alkyl groups such as methyl, ethyl, n-propyl, n-butyl, n-pentyl, n-hexyl, n-heptyl, n-octyl and decyl groups; branched alkyl groups such as isopropyl, isobutyl, sec-butyl, tert-butyl, neopentyl, thexyl and 2-ethylhexyl groups; cyclic alkyl groups such as cyclopentyl and cyclohexyl groups; alkenyl groups such as vinyl, allyl, propenyl, butenyl and pentenyl groups; aryl groups such as phenyl and tolyl groups; and aralkyl groups such as benzyl and phenethyl groups.

Among them, a methyl group, an ethyl group, a propyl group, a vinyl group and a phenyl group are preferable from the viewpoint of availability of raw materials.

In addition, the monovalent hydrocarbon group of $R^1$ may be substituted with fluorine atoms or chlorine atoms at a part or all of hydrogen atoms. Specific examples of the monovalent hydrocarbon group substituted with these atoms include fluoroalkyl groups such as a (3,3,3-trifluoro)propyl group; and chloroalkyl groups such as a chloromethyl group and a chloropropyl group.

In the general formula (1), $R^2$ and $R^3$ are each independently an unsubstituted monovalent hydrocarbon group having 1 to 6, preferably 1 to 3 carbon atoms.

The monovalent hydrocarbon groups of $R^2$ and $R^3$ may be linear, branched or cyclic, and specific examples thereof include linear alkyl groups such as methyl, ethyl, n-propyl, n-butyl, n-pentyl and n-hexyl groups; branched alkyl groups such as isopropyl, isobutyl, sec-butyl and tert-butyl groups; cyclic alkyl groups such as cyclopentyl and cyclohexyl groups; alkenyl groups such as vinyl, allyl, propenyl, butenyl and pentenyl groups; and aryl groups such as a phenyl group.

Among them, a methyl group and an ethyl group are preferable from the viewpoint of availability of raw materials.

In the general formula (1), $R^4$ is a divalent hydrocarbon group having 1 to 20, preferably 1 to 10, more preferably 1 to 6 carbon atoms, which may contain a sulfur atom, a silicon atom, an ester bond or a urea bond.

The divalent hydrocarbon group of $R^4$ may be linear, branched or cyclic, and specific examples thereof include linear alkylene groups such as methylene, ethylene, trimethylene, tetramethylene, hexamethylene, octamethylene and decylene groups; branched alkylene groups such as methylethylene and methyltrimethylene groups; cyclic alkylene groups such as cyclohexylene and methylenecyclohexylenemethylene groups; linear alkenylene groups such as propenylene, butenylene, hexenylene and octenylene groups; branched alkenylene groups such as isopropenylene and isobutenylene groups; arylene groups such as a phenylene group; and aralkylene groups such as methylenephenylene, methylenephenylenemethylene and methylenephenyleneethylene groups.

Among them, linear alkylene groups are preferable and linear alkylene groups having 1 to 6 carbon atoms are more preferable from the viewpoint of availability of raw materials.

Specific examples of the divalent hydrocarbon group where $R^4$ contains a sulfur atom include thioalkylene groups and alkylenethioalkylene groups.

Specific examples of the divalent hydrocarbon group where $R^4$ contains a silicon atom include alkylenedialkylsilylalkylene groups, and groups of the following general formula (3).

(3)

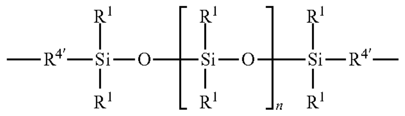

wherein $R^1$ represents the same meaning as described above.

In the general formula (3), $R^{4}$'s are each independently an oxygen atom or a divalent hydrocarbon group having 1 to 20, preferably 1 to 10, more preferably 1 to 6 carbon atoms, and the total number of carbon atoms in two $R^{4}$'s is equal to that in $R^4$. Specific examples of the divalent hydrocarbon group include the same groups as exemplified for $R^4$ above.

Examples of the divalent hydrocarbon group where $R^4$ contains an ester bond include substituents of the following general formula (4), and examples of the divalent hydrocarbon group where $R^4$ contains a urea bond include substituents of the following general formula (5).

(4)

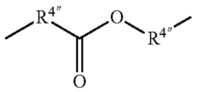

(5)

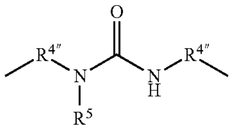

In the general formulae (4) and (5), $R^{4''}$s are each independently a single bond or a divalent hydrocarbon group having 1 to 10, preferably 1 to 6, more preferably 1 to 3 carbon atoms, and the total number of carbon atoms in two $R^{4''}$s is equal to that in $R^4$. Examples of the divalent hydrocarbon group of $R^{4''}$ include groups having 1 to 10 carbon atoms, among exemplified for $R^4$ above.

In the general formula (5), $R^5$ is a hydrogen atom or an unsubstituted monovalent hydrocarbon group having 1 to 10, preferably 1 to 6, more preferably 1 to 3 carbon atoms. Examples of the monovalent hydrocarbon group of $R^5$ include the same substituents as those of R', and a hydrogen atom is particularly preferable from the viewpoint of availability of raw materials.

In the general formula (1), p is an integer of 1 to 1000, preferably 4 to 300, more preferably 12 to 100, from the viewpoint of easy handling and an ability to sufficiently impart a water-repellent property.

q is 0 or 1, and r is 0, 1, or 2.

In the general formula (1), X represents a group of the following general formula (2) or $R^1{}_3Si$.

(2)

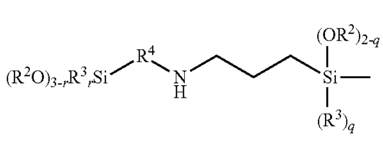

wherein $R^2$ to $R^4$, q and r represent the same meaning as described above.

The compound (1) is obtained by, for example, reacting a silanol-modified polysiloxane compound of the following general formula (6) (hereinafter, referred to as a "compound (6)") with a cyclic silazane compound having an alkoxysilyl group, represented by the following general formula (7) (hereinafter, referred to as a "compound (7)").

In addition, the compound (7) can be produced by a known method described in JP-A 2011-102267 or the like.

(6)

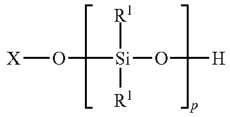

(7)

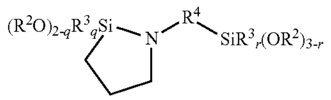

wherein $R^1$ to $R^4$, X, p, q and r represent the same meaning as described above.

Specific examples of the compound (6) include 1-hydroxypolysiloxane compounds such as 1-hydroxy-1,1,3,3,5,5,7,7,7-nonamethyltetrasiloxane, 1-hydroxy-1,1,3,3,5,5,7,7-octamethyl-7-vinyltetrasiloxane, 1-hydroxy-1,1,3,3,5,5,7,7-octamethyl-7-chloromethyltetrasiloxane, 1-hydroxy-1,1,3,3,5,5,7,7-octamethyl-7-chloropropyltetrasiloxane, 1-hydroxy-1,1,3,3,5,5-hexavinyl-7,7,7-trimethyltetrasiloxane, 1-hydroxy-1,1,3,3,5,5-hexaphenyl-7,7,7-trimethyltetrasiloxane, 1-hydroxy-1,3,5-tris(3,3,3-trifluoropropyl)-1,3,5,7,7,7-hexamethyltetrasiloxane, 1-hydroxy-1,1,3,3,5,5,7-heptavinyl-7,7-dimethyltetrasiloxane, 1-hydroxy-1,1,3,3,5,5,7-heptamethyl-7,7-diphenyltetrasiloxane, 1-hydroxy-1,1,3,3,5,5,7,7-octaphenyl-7-methyl-tetrasiloxane, 1-hydroxy-1,1,3,3,5,5,7,7,7-nonaphenyltetrasiloxane, α-hydroxy-ω-methylpolydimethylpolysiloxane, α-hydroxy-ω-vinylpolydimethylpolysiloxane, α-hydroxy-ω-chloromethyldimethylpolysiloxane, α-hydroxy-ω-chloropropyldimethylpolysiloxane and α-hydroxy-ω-phenyldimethylpolysiloxane; dihydroxypolysiloxane compounds such as 1,7-dihydroxy-1,1,3,3,5,5,7,7-octamethyltetrasiloxane, 1,7-dihydroxy-1,1,3,3,5,5,7-heptamethyl-7-vinyltetrasiloxane, 1,7-dihydroxy-1,3,5-tris(3,3,3-trifluoropropyl)-1,3,5,7,7-pentamethyltetrasiloxane and α,ω-dihydroxydimethylpolysiloxane; and dialkylsilanediols such as dibutylsilanediol, diphenylsilanediol and dicyclopentylsilanediol.

Specific examples of the compound (7) include cyclic silazane compounds having a trialkoxysilylalkyl group, such as 2,2-dimethoxy-N-(trimethoxysilylpropyl)-1-aza-2-silacyclopentane, 2,2-dimethoxy-N-(trimethoxysilylmethyl)-1-aza-2-silacyclopentane, 2,2-dimethoxy-N-(trimethoxysilylhexyl)-1-aza-2-silacyclopentane, 2,2-dimethoxy-N-(trimethoxysilyloctyl)-1-aza-2-silacyclopentane, 2-methoxy-2-methyl-N-(trimethoxysilylpropyl)-1-aza-2-silacyclopentane, 2-methoxy-2-methyl-N-(trimethoxysilylhexyl)-1-aza-2-silacyclopentane, 2-methoxy-2-methyl-N-(trimethoxysilyloctyl)-1-aza-2-silacyclopentane, 2,2-diethoxy-N-(triethoxysilylpropyl)-1-aza-2-silacyclopentane, 2,2-diethoxy-N-(triethoxysilylmethyl)-1-aza-2-silacyclopentane, 2,2-diethoxy-N-(triethoxysilylhexyl)-1-aza-2-silacyclopentane, 2,2-diethoxy-N-(triethoxysilyloctyl)-1-aza-2-silacyclopentane, 2-ethoxy-2-methyl-N-(triethoxysilylpropyl)-1-aza-2-silacyclopentane, 2-ethoxy-2-methyl-N-(triethoxysilylhexyl)-1-aza-2-silacyclopentane, 2-ethoxy-2-methyl-N-(triethoxysilyloctyl)-1-aza-2-silacyclopentane, 2,2-dimethoxy-N-(trimethoxysilylthioethyl)-1-aza-2-silacyclopentane, 2,2-dimethoxy-N-(trimethoxysilylthioethyl)-1-aza-2-silacyclopentane, 2-methoxy-2-methyl-N-(trimethoxysilylthioethyl)-1-aza-2-silacyclopentane, 2-methoxy-2-methyl-N-(trimethoxysilylthioethyl)-1-aza-2-silacyclopentane, 2,2-dimethoxy-N-(trimethoxysilylthiopropyl)-1-aza-2-silacyclopentane, 2,2-dimethoxy-N-(trimethoxysilylthiopropyl)-1-aza-2-silacyclopentane, 2-methoxy-2-methyl-N-(trimethoxysilylthiopropyl)-1-aza-2-silacyclopentane, 2-methoxy-2-methyl-N-(trimethoxysilylthiopropyl)-1-aza-2-silacyclopentane, 2,2-dimethoxy-N-[(trimethoxysilyl)ethyldimethylsiloxydimethylsilyl(methyl)propyl]-1-aza-2-silacyclopentane, 2-methoxy-2-methyl-N-[(trimethoxysilypethyldimethylsiloxydimethylsilyl(methyl)propyl]-1-aza-2-silacyclopentane, 2,2-dimethoxy-N-(3-trimethoxysilylpropoxycarbonylethyl)-1-aza-2-silacyclopentane, 2,2-diethoxy-N-(3-triethoxysilylpropoxycarbonylethyl)-1-aza-2-silacyclopentane, 2,2-dimethoxy-N-(3-trimethoxysilylpropoxycarbonyl(methyl)ethyl)-1-aza-2-silacyclopentane, 2,2-diethoxy-N-(3-triethoxysilylpropoxycarbonyl(methyl)ethyl)-1-aza-2-silacyclopentane, 2,2-dimethoxy-N-(3-trimethoxysilylpropylureidoethyl)-1-aza-2-silacyclopentane, 2-methoxy-2-methyl-N-(3-trimethoxysilylpropylureidoethyl)-1-aza-2-silacyclopentane, 2,2-diethoxy-N-(3-triethoxysilylpropylureidoethyl)-1-aza-2-silacyclopentane, 2-ethoxy-2-methyl-N-(3-triethoxysilylpropylureidoethyl)-1-aza-2-silacyclopentane, 2,2-dimethoxy-N-(trimethoxysilylethyldimethylsiloxydimethylsilylpropyl(methyl)))-1-aza-2-silacyclopentane and 2,2-dimethoxy-N-(1,1,1-trimethoxy-3,3,5,5,7,7-hexamethyltetrasiloxydimethylsilylpropyl)-1-aza-2-silacyclopentane; cyclic silazane compounds having an alkyldialkoxysilylalkyl group, such as 2,2-dimethoxy-N-(methyldimethoxysilylpropyl)-1-aza-2-silacyclopentane, 2,2-dimethoxy-N-(methyldimethoxysilylmethyl)-1-aza-2-silacyclopentane, 2,2-dimethoxy-N-(methyldimethoxysilylhexyl)-1-aza-2-silacyclopentane, 2,2-dimethoxy-N-(methyldimethoxysilyloctyl)-1-aza-2-silacyclopentane, 2-methoxy-2-methyl-N-(methyldimethoxysilylhexyl)-1-aza-2-silacyclopentane, 2-methoxy-2-methyl-N-(methyldimethoxysilyloctyl)-1-aza-2-silacyclopentane, 2,2-diethoxy-N-(methyldiethoxysilylpropyl)-1-aza-2-silacyclopentane, 2,2-diethoxy-N-(methyldiethoxysilylmethyl)-1-aza-2-silacyclopentane, 2,2-diethoxy-N-(methyldiethoxysilylhexyl)-1-aza-2-silacyclopentane, 2,2-diethoxy-N-(methyldiethoxysilyloctyl)-1-aza-2-silacyclopentane, 2-ethoxy-2-methyl-N-(methyldiethoxysilylhexyl)-1-aza-2-silacyclopentane, 2-ethoxy-2-methyl-N-(methyldiethoxysilyloctyl)-1-aza-2-silacyclopentane, 2,2-dimethoxy-N-(methyldimethoxysilylthioethyl)-1-aza-2-silacyclopentane, 2,2-dimethoxy-N-(methyldimethoxysilylthioethyl)-1-aza-2-silacyclopentane, 2-methoxy-2-methyl-N-(methyldimethoxysilylthioethyl)-1-aza-2-silacyclopentane, 2-methoxy-2-methyl-N-(methyldimethoxysilylthioethyl)-1-aza-2-silacyclopentane, 2,2-dimethoxy-N-(methyldimethoxysilylthiopropyl)-1-aza-2-silacyclopentane, 2,2-dimethoxy-N-(methyldimethoxysilylthiopropyl)-1-aza-2-silacyclopentane, 2-methoxy-2-methyl-N-(methyldimethoxysilylthiopropyl)-1-aza-2-silacyclopentane, 2-methoxy-2-methyl-N-(methyldimethoxysilylthiopropyl)-1-aza-2-silacyclopentane, 2,2-dimethoxy-N-(3-methyldimethoxysilylpropoxycarbonylethyl)-1-aza-2-silacyclopentane, 2,2-diethoxy-N-(3-methyldiethoxysilylpropoxycarbonylethyl)-1-aza-2-silacyclopentane, 2,2-dimethoxy-N-(3-methyldimethoxysilylpropoxycarbonyl(methyl)ethyl)-2-aza-1-silacyclopentane and 2,2-diethoxy-N-(3-methyldiethoxysilylpropoxycarbonyl(methyl)ethyl)-1-aza silacyclopentane; and cyclic silazane compounds having a dialkylalkoxysilylalkyl group, such as 2,2-dimethoxy-N-(dimethylmethoxysilylmethyl)-1-aza-2-silacyclopentane, 2,2-dimethoxy-N-(dimethylmethoxysilylhexyl)-1-aza-2-silacyclopentane, 2,2-dimethoxy-N-(dimethylmethoxysilylocty)-1-aza-2-silacyclopentane, 2-methoxy-2-methyl-N-(dimethylmethoxysilylhexyl)-1-aza-2-silacyclopentane, 2-methoxy-2-methyl-N-(dimethylmethoxysilyloctyl)-1-aza-2-silacyclopentane, 2,2-dimethoxy-N-(diethylmethoxysilylhexyl)-1-aza-2-silacyclopentane, 2,2-dimethoxy-N-(diethylmethoxysilyloctyl)-1-aza-2-silacyclopentane, 2-methoxy-2-methyl-N-(diethylmethoxysilylhexyl)-1-aza-2-silacyclopentane, 2-methoxy-2-methyl-N-(diethylmethoxysilyloctyl)-1-aza-2-silacyclopentane, 2,2-dimethoxy-N-(diphenylmethoxysilylhexyl)-1-aza-2-silacyclopentane, 2,2-dimethoxy-N-(diphenylmethoxysilyloctyl)-1-aza-2-silacyclopentane, 2-methoxy-2-methyl-N-(diphenylmethoxysilylhexyl)-1-aza-2-silacyclopentane, 2-methoxy-2-methyl-N-(diphenylmethoxysilyloctyl)-1-aza-2-silacyclopentane and 2,2-diethoxy-N-(dimethylethoxysilylmethyl)-1-aza-2-silacyclopentane.

Specific examples of the compound (1) include 1-(alkoxysilylalkylaminopropyl)polysiloxane compounds where X is $R^1{}_3Si$, such as 1-(3-trimethoxysilylpropylaminopropyl)-1,1-dimethoxy-3,3,5,5,7,7,9,9,9-nonamethylpentasiloxane, 1-(3-triethoxysilylpropylaminopropyl)-1,1-diethoxy-3,3,5,5,7,7,9,9,9-nonamethylpentasiloxane, 1-(8-trimethoxysilylpropylaminooctyl)-1,1-dimethoxy-3,3,5,5,7,7,9,9,9-nonamethylpentasiloxane, 1-(8-triethoxysilylpropylaminopropyl)-1,1-diethoxy-3,3,5,5,7,7,9,9,9-nonamethylpentasiloxane, 1-(8-triethoxysilylpropylaminopropyl)-1-ethoxy-1,3,3,5,5,7,7,9,9,9-decamethylpentasiloxane, 1-(3-trimethoxysilylpropylaminopropyl)-1,1-dimethoxy-3,3,5,5,7,7,9,9,9-nonamethylpentasiloxane, 1-(3-trimethoxysilylpropylaminopropyl)-1,1-dimethoxy-3,3,5,5,7,7,9,9-octamethyl vinylpentasiloxane, 1-(3-trimethoxysilylpropylaminopropyl)-1,1-dimethoxy-3,3,5,5,5,7,7,9,9-octamethyl chloromethylpentaloxane, 1-(3-trimethoxysilylpropylaminopropyl)-1,1-dimethoxy-3,3,5,5,7,7,9,9-octamethyl chloropropylpentasiloxane, 1-(3-trimethoxysilylpropylaminopropyl)-1,1-dimethoxy-3,3,5,5,7,7-hexavinyl-9,9,9-trimethylpentasiloxane, 1-(3-trimethoxysilylpropylaminopropyl)-1,1-dimethoxy-3,3,5,7,7-hexaphenyl-9,9,9-trimethylpentasiloxane, 1-(3-trimethoxysilylpropylaminopropyl)-1,1-dimethoxy-3,5,7-tris(3,3,3-trifluoropropyl)-3,5,7,9,9,9-hexamethylpentasiloxane, 1-(3-trimethoxysilylpropylaminopropyl)-1,1-dimethoxy-3,3,5,5,7,7,9-heptavinyl-9,9-dimethylpentasiloxane, 1-(3-trimethoxysilylpropylaminopropyl)-1,1-dimethoxy-3,3,5,5,7,7,9,-heptamethyl-9,9-diphenylpentasiloxane, 1-(3-trimethoxysilylpropylaminopropyl)-1,1-dimethoxy-3,3,5,5,7,7,9,9-octaphenyl-7-methyl-pentasiloxane, 1-(3-trimethoxysilylpropylaminopropyl)-1,1-dimethoxy-3,3,5,5,7,7,9,9,9-nonaphenylpentasiloxane, α-(3-trimethoxysilylpropylaminopropyl)-α,α-dimethoxy-ω-methylpolydimethylpolysiloxane, α-(3-triethoxysilylpropylaminopropyl)-α,α-diethoxy-ω-methylpolydimethylpolysiloxane, α-(3-trimethoxysilylpropylaminopropyl)-α,α-dimethoxy-ω-vinylpolydimethylpolysiloxane, α-(3-trimethoxysilylpropylaminopropyl)-α,α-dimethoxy-ω-chloromethyldimethylpolysiloxane, α-(3-trimethoxysilylpropylaminopropyl)-α,α-dimethoxy-ω-chloropropyldimethylpolysiloxane and α-(3-trimethoxysilylpropylaminopropyl)-α,α-dimethoxy-w-phenyldimethylpolysiloxane; and α,ω-bis(alkoxysilylalkylaminopropyl)polysiloxane compounds where X has the general formula (2), 1,11-bis(3-trimethoxysilylpropylaminopropyl)-1,1,11,11-tetramethoxy-3,3,5,5,7,7,9,9-octamethylhexasiloxane, 1,11-bis(3-triethoxysilylpropylaminopropyl)-1,1,11,11-tetraethoxy-3,3,5,5,7,7,9,9-octamethylhexasiloxane, 1,11-bis(3-trimethoxysilylpropylaminopropyl)-1,1,11,11-tetramethoxy-3,3,5,5,7,7,9-heptamethyl-9-vinylhexasiloxane, 1,11-bis(3-trimethoxysilylpropylaminopropyl)-1,1,11,11-tetramethoxy-3,5,7-tris(3,3,3-trifluoropropyl)-3,5,7,9,9-pentamethylhexasiloxane, α,ω-bis(3-trimethoxysilylpropylaminopropyl)-α,α,ω,ω-tetramethoxydimethylpolysiloxane, α,ω-bis(3-triethoxysilylpropylaminopropyl)-α,α, ω, ω-tetraethoxydimethylpolysiloxane, α,ω-bis(8-trimethoxysilylpropylaminooctyl)-α,α,ω,ω-tetramethoxydimethylpolysiloxane, α,ω-bis(8-triethoxysilylpropylaminooctyl)-α,α, ω,ω-tetraethoxydimethylpolysiloxane, α,ω-bis (trimethoxysilylpropylaminomethyl)-α,α,ω,ω-tetramethoxydimethylpolysiloxane, α,ω-bis (triethoxysilylpropylaminomethyl)-α,α,ω,ω-tetraethoxydimethylpolysiloxane, α,ω-bis (dimethylmethoxysilylpropylaminomethyl)-α,α,ω,ω-tetramethoxydimethylpolysiloxane and α,ω-bis (dimethylethoxysilylpropylaminomethyl)-α,α,ω,ω-tetramethoxydimethylpolysiloxane.

Next, the hydrolyzable group-containing organosilicon compound is described.

The hydrolyzable group-containing organosilicon compound for use in the present invention is not particularly limited as long as it has a functional group that can be subjected to hydrolytic condensation, and at least one selected from the group consisting of alkoxysilane, a partial hydrolytic condensate of alkoxysilane, a polysilazane and a polysiloxazane is preferable.

The alkoxysilane compound is, for example, a compound of the following general formula (8) (hereinafter, referred to as a "compound (8)").

$$R^6_x—Si(OR^7)_{4-x} \quad (8)$$

In the general formula (8), $R^6$s are each independently an unsubstituted monovalent hydrocarbon group having 1 to 10, preferably 1 to 6 carbon atoms, which may contain an oxygen atom, $R^7$ is an unsubstituted monovalent hydrocarbon group having 1 to 10, preferably 1 to 6 carbon atoms, and x is an integer of 0 to 2.

Specific examples of the monovalent hydrocarbon group of $R^6$ and $R^7$ include the same substituents as $R^1$.

Specific examples of the monovalent hydrocarbon group where $R^6$ contains an oxygen atom include alkyloxyalkyl groups such as methoxymethyl, ethoxymethyl and methoxypropyl groups.

Specific examples of the compound (8) include dialkyldialkoxysilane compounds such as dimethyldimethoxysilane, dimethyldiethoxysilane, diphenyldimethoxysilane, diphenyldiethoxysilane and dicyclopentyldimethoxysilane; alkyltrialkoxysilanes such as methyltrimethoxysilane, methyltriethoxysilane, ethyltrimethoxysilane, ethyltriethoxysilane, propyltrimethoxysilane, propyltriethoxysilane, hexyltrimethoxysilane, hexyltriethoxysilane, octyltrimethoxysilane, octyltriethoxysilane, decyltrimethoxysilane, decyltriethoxysilane, methoxymethyltrimethoxysilane, ethoxymethyltriethoxysilane, phenyltrimethoxysilane and phenyltriethoxysilane; and tetraalkoxysilane compounds such as tetramethoxysilane and tetraethoxysilane.

The partial hydrolytic condensate of the compound (8) is obtained by adding water to the compound (8) in the presence of a catalyst if necessary, and heating and stirring the mixture if necessary. Here, the alkoxysilane compounds may be used alone or used in combination of two or more thereof.

The polysilazane compound is a polycondensate of a chlorosilane compound and ammonia, and is, for example, a compound having a repeating unit of the following general formula (9) (hereinafter, referred to as a "compound (9)"),

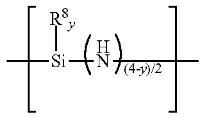

(9)

In the general formula (9), $R^8$s are each independently a substituted or unsubstituted monovalent hydrocarbon group having 1 to 10 carbon atoms, which may contain an organosiloxane group of the following general formula (9A) at a terminal. Examples of the monovalent hydrocarbon group of $R^8$ include the same substituents as $R^1$.

y is 0, 1, 2, or 3.

$$—Si(R^9)_a[(OSi(R^9)_2)_bOSi(R^9)_3]_{(3-a)} \quad (9A)$$

In the formula (9A), $R^9$s are each independently a monovalent hydrocarbon group having 1 to 10, preferably 1 to 6 carbon atoms, and a part or all of hydrogen atoms in the monovalent hydrocarbon group may be substituted with a halogen atom such as a chlorine atom, a bromine atom or an iodine atom.

In the formula (9A), a is 0, 1, 2 or 3, and when a is 0 or 1, a plurality of $OSiR^9_3$ groups may be subjected to condensation by siloxane elimination to form a cyclic siloxane. b represents an integer of 0 to 30, preferably 0 to 20, more preferably 5 to 15.

The combination of $R^9$, a and b is arbitrary and is not limited.

Specific examples of the organosiloxane group of the general formula (9A), which is defined by $R^9$, a and b, include trialkylsilyl groups such as trimethylsilyl, triethylsilyl, tert-butyldimethylsilyl, triisopropylsilyl and tert-butyldiphenylsilyl groups; polyalkylpolysiloxanyl groups such as pentamethyldisiloxanyl, heptamethyltrisiloxanyl, nonamethyltetrasiloxanyl, α-trimethylsilyl-polydimethylsiloxanyl and α-butyldimethylsilyl-polydimethylsiloxanyl; and polyalkylcyclopolysiloxanyl groups such as pentamethylcyclotrisiloxanyl, heptamethylcyclotetrasiloxanyl and nonamethylcyclopentasiloxanyl groups.

The polysilazane compound may include only one constituent unit as shown in the general formula (9), or may include two or more constituent units. However, a case is excluded where the polysilazane compound includes only one unit in which y is 3, i.e. a hexaalkyldisilazane.

The compound (9) is obtained by reacting the chlorosilane compound with ammonia in the presence of a solvent if necessary, and removing ammonium chloride generated with progression of the reaction.

The polysiloxazane compound has a siloxane structure and a silazane structure in the molecule, and is, for example, a compound of the following general formula (10) (hereinafter, referred to as a "compound (10)").

(10)

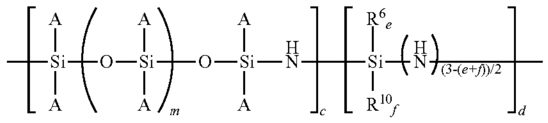

wherein $R^6$ represents the same meaning as described above.

In the general formula (10), $R^{10}$s are each independently a substituted or unsubstituted monovalent hydrocarbon group having 1 to 10 carbon atoms, which may contain a sulfur atom or a silicon atom. Examples of the monovalent hydrocarbon group of $R^{10}$ include the same substituents as $R^1$.

Specific examples of the monovalent hydrocarbon group where $R^{10}$ contains a sulfur atom include alkylenethioalkyl groups.

Specific examples of the monovalent hydrocarbon group where $R^{10}$ contains a silicon atom include trialkylsilylalkyl groups, dialkylmonoalkoxysilylalkyl groups, alkyldialkoxysilylalkyl groups and trialkoxysilylalkyl groups, and the monovalent hydrocarbon group may contain an organosiloxane group of the general formula (9A) at a terminal of the monovalent hydrocarbon group.

Further, $R^{10}$ may contain both a sulfur atom and a silicon atom. Specific examples of the monovalent hydrocarbon group where the group contains both a sulfur atom and a silicon atom include alkylenethioalkylenedialkylmonoalkoxysilyl groups, alkylenethioalkylenealkyldialkoxysilyl groups and alkylenethioalkylenetrialkoxysilyl groups.

In the general formula (10), A's each independently represent $R^6$, an oxygen atom or NH—$SiA_2$, or an oxygen atom where A's are bonded to each other.

e and f are each independently 0, 1 or 2, provided that both e and f are not 0.

m represents an integer of 0 to 300, preferably 2 to 100, more preferably 2 to 40.

c and d are numbers satisfying $0<c\leq 1$, $0\leq d<1$ and $c+d=1$, and when the number of NH—$SiA_2$s is g, c is a number satisfying $0\leq g/(2m+4)\leq 0.5$.

Like the polysilazane compound, the compound (10) is obtained by reacting a chlorosiloxane compound of the following general formula (12) and a polysiloxane modified at both terminals with silanol, which is represented by the following general formula (13), with ammonia in the presence of a solvent if necessary, and removing ammonium chloride generated with the progression of the reaction.

(12)

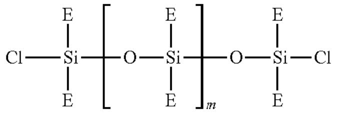

(13)

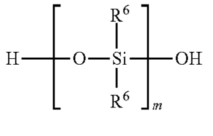

wherein $R^6$ and m represent the same meaning as described above.

In the general formula (12), E's each independently represent $R^6$, a chlorine atom or an oxygen atom, or an oxygen atom where E's are bonded to each other.

In the general formula (12), h satisfies $0\leq h/(2m+2)\leq 0.5$, where h is a number of chlorine atoms.

In the curable composition of the present invention, the hydrolyzable group-containing organosilicon compound may be used alone, or used as a combination of a plurality of components. Examples of the combination of a plurality of components used as the hydrolyzable group-containing organosilicon compound include mixtures of the compound (8) and a partial hydrolytic condensate thereof, mixtures of a partial hydrolytic condensate of the compound (8) and the compound (9), and mixtures of a partial hydrolytic condensate of the compound (8) and the compound (10).

The compounding ratio of the compound (1) to the hydrolyzable group-containing organosilicon compound in the curable composition is not particularly limited, and the amount of the compound (1) is preferably 0.1 to 90 wt %, more preferably 0.5 to 75 wt %, still more preferably 1 to 60 wt %, per total weight of the compound (1) and the hydrolyzable group-containing organosilicon compound.

The curable composition can be used without a solvent, and a solvent may be used as long as it does not affect the compound (1) and the hydrolyzable group-containing organosilicon compound.

Specific examples of the solvent include aliphatic hydrocarbon compounds having 5 to 20 carbon atoms, such as pentane, hexane, cyclohexane, octane, isooctane, nonane, decane, dodecane and isododecane; aromatic hydrocarbon compounds having 6 to 10 carbon atoms, such as benzene, toluene and xylene; ether compounds such as diethyl ether, tetrahydrofuran, 4-methyltetrahydrofuran, cyclopentylmethyl ether and dioxane; ester compounds such as ethyl acetate, isopropyl acetate and butyl acetate; aprotic polar compounds such as acetonitrile, N,N-dimethylformamide; alcohol compounds such as methanol, ethanol, propanol, 2-propanol and butanol; chlorinated hydrocarbon compounds such as dichloromethane and chloroform; and siloxane compounds having 2 to 10 silicon atoms, such as hexamethyldisiloxane, octamethyltrisiloxane, tris(trimethylsiloxy)methylsilane, octamethylcyclotetrasiloxane, decamethyltetrasiloxane, decamethylcyclopentasiloxane and dodecamethylpentasiloxane. These solvents may be used alone or used in combination of two or more thereof.

Of these, aliphatic hydrocarbon compounds having 8 to 12 carbon atoms and siloxane compounds having 2 to 8 silicon atoms are particularly preferable from the viewpoint of safety.

The amount of the solvent used is not particularly limited, and is preferably an amount which ensures that the concentration of the compound (1) and the hydrolyzable group-containing organosilicon compound is preferably 0.1 to 90 wt %, more preferably 1 to 90 wt %, still more preferably 5 to 80 wt %.

In addition, the curable composition may contain at least one metal compound selected from a titanium compound, an aluminum compound, a zinc compound and a tin compound as a curing catalyst.

Specific examples of the titanium compound include tetraalkyl orthotitanate such as tetrabutyl orthotitanate, tetramethyl orthotitanate, tetraethyl orthotitanate, tetrapropyl orthotitanate and tetraisopropyl orthotitanate, partial hydrolytic condensates thereof, and titanium acylates.

Specific examples of the aluminum compound include aluminum trihydroxide, aluminum alcoholates, aluminum acylates, salts of aluminum acylates, aluminosyloxy compounds and aluminum metal chelate compounds.

Specific examples of the zinc compound include zinc octylate and zinc 2-ethylhexanoate.

Specific examples of the tin compound include dioctyltin dioctate and dioctyltin dilaurate.

The amount of the curing catalyst used is not particularly limited, and is preferably 0.01 to 10 wt %, more preferably 0.1 to 5 wt %, per weight of the curable composition, from the viewpoint of exhibiting the effect of the catalyst.

The curing catalyst may be added to the curable composition later, or added with the curing catalyst dissolved in a hydrolyzable group-containing organosilicon compound or a solvent.

The curable composition may contain one or more other additives selected from pigments, antifoaming agents, lubricants, preservatives, pH adjusters, film forming agents, antistatic agents, antibacterial agents, dyes and the like as long as the effects of the curable composition are not impaired.

The curable composition is obtained by mixing the compound (1) and the hydrolyzable group-containing organosilicon compound with a solvent used if necessary, a curing catalyst and other additives while being careful to prevent ingress of moisture, thereby forming a homogeneous solution. Specifically, when the components are handled in an atmosphere of an inert gas such as nitrogen or argon, ingress of moisture can be avoided.

The order of addition of the components is not limited, and it is preferable the curing catalyst is added last from the viewpoint of minimizing progression of hydrolysis.

Next, a cured product obtained by curing the curable composition is described.

The cured product of the present invention is obtained by curing the curable composition. Specifically, the alkoxysilyl group in the compound (1) contained in the curable composition and the hydrolyzable group in the hydrolyzable group-containing organosilicon compound are each subjected to hydrolytic condensation to cure the curable composition.

When the curable composition contains a solvent, the solvent may be volatilized before the composition is cured, or the composition may be cured while the solvent is volatilized.

Ordinary temperature or a temperature under heating can be employed as a temperature during curing. The temperature here is not particularly limited as long as the substrate is not adversely affected, and for maintaining reactivity, the temperature is preferably 0 to 250° C., more preferably 20 to 180° C., still more preferably 20 to 150° C.

Curing is performed in an atmosphere at a relative humidity of preferably 15 to 100%, more preferably 25 to 80%, because reaction with moisture in the air occurs.

In addition, it is possible to obtain a covered substrate by covering a surface of a substrate such as an inorganic material or an organic material with the curable composition, and then reacting the curable composition with moisture in the air to cure the curable composition of the present invention.

Specific examples of the inorganic material include metal, glass, silica, alumina, talc, calcium carbonate and carbon.

As the glass, types of glass which are commonly used, such as E glass, C glass and quartz glass can be used, and glass fibers may be used. The glass fibers may be in the form of an aggregate of the glass fibers, for example, a glass-based (filament) fiber bundle having a fiber diameter of 3 to 30 μm, a twisted yarn, or a woven fabric.

Specific examples of the organic material include resin materials such as polyethylene, polypropylene, polystyrene, poly(meth)acryl, polyvinyl chloride, polycarbonate, nylon, polyurethane, polybutylene terephthalate, polyethylene terephthalate, ABS (polymer of acrylonitrile, butadiene and styrene), melamine, phenol, epoxy and polyimide; elastomers such as polybutadiene rubber, polyisopropylene rubber, nitrile rubber, neoprene rubber, polysulfide and urethane rubber; and rubber materials, and poly (meth)acryl is particularly preferable.

The shape of the substrate is not particularly limited, and may be a plate shape, a sheet shape, a fibrous shape or a powdered shape.

Examples of the method for applying the curable composition to the substrate include known application methods such as a brush coating method, a sponge coating method, a cloth coating method, a spray coating method, a wire bar method, a blade method, a roll coating method, a dipping method and a spin coating method.

In addition, for powdered materials such as silica, alumina, talc and calcium carbonate, a mixing method may be employed in which the curable composition is directly mixed together with the substrate by use of a mixer or a mill.

EXAMPLES

Production Examples, Synthesis Examples, Examples and Comparative Examples are given below to more concretely illustrate the present invention, but the present invention is not limited by these Examples.

Production Example 1

Synthesis of 2,2-dimethoxy-N-(trimethoxysilyloctyl)-1-aza-2-silacyclopentane

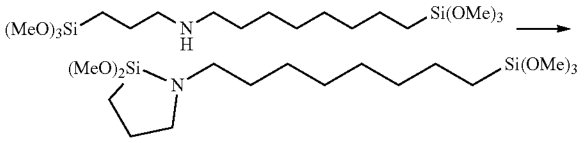

wherein Me represents a methyl group; and the same applies hereinafter.

The inside of a four-necked glass flask equipped with a stirrer, a thermometer, a distillation tower and a reflux condenser was purged with nitrogen, 122 g (0.296 mol) of (trimethoxysilylpropyl)-(trimethoxysilyloctyl)amine, 132 g of toluene and 0.75 g (0.0050 mol) of trifluoromethanesulfonic acid were added, and the mixture was refluxed. To this mixture was added 58.4 g (0.311 mol) of N-trimethylsilyl-N-methylaniline, the mixture was stirred, and generated trimethylmethoxysilane was taken out together with toluene using a distillation column until the temperature reached a reaction temperature of 150° C.

Figure 2:
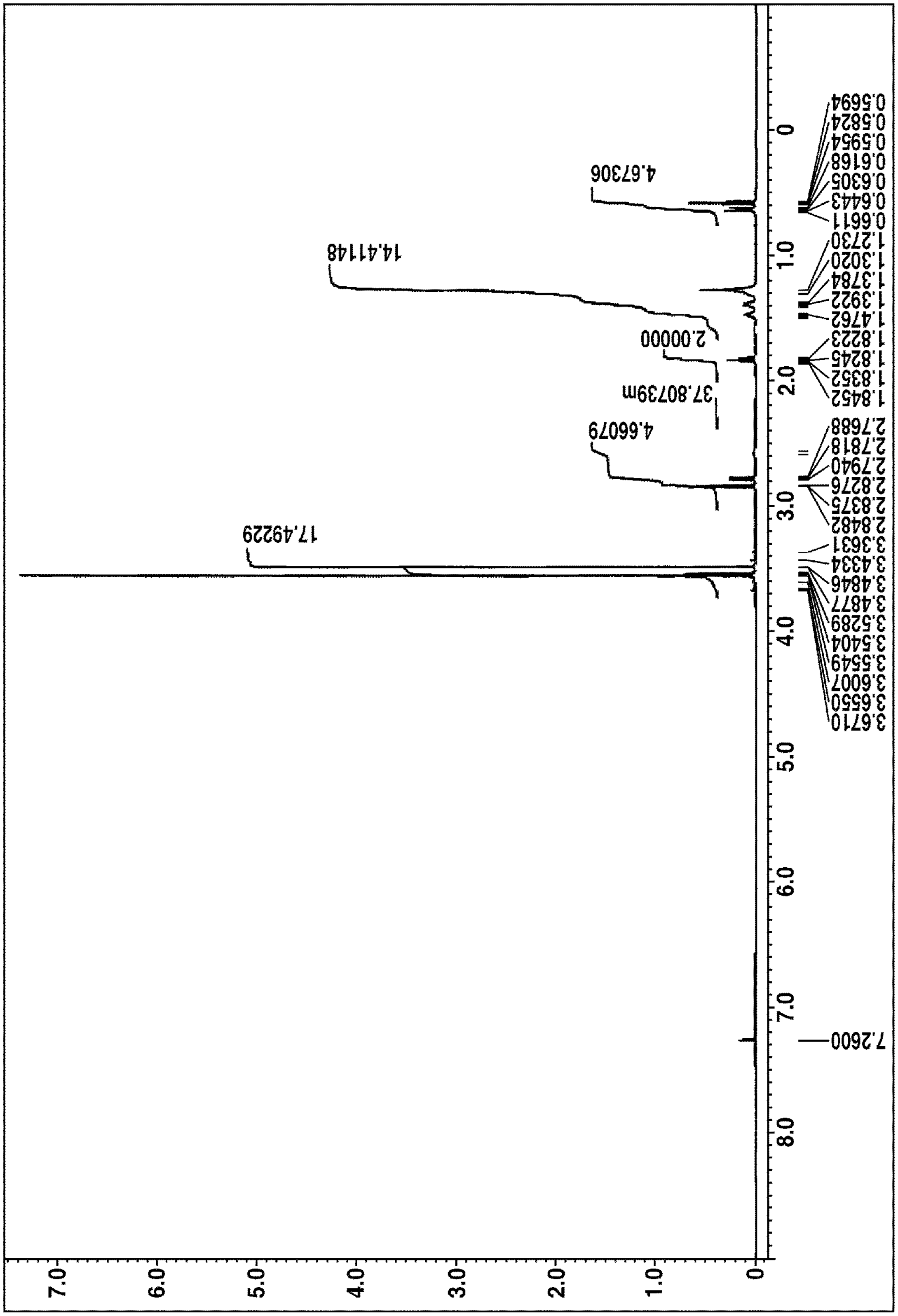
FIG. 2 is a diagram showing a $^1$H-NMR spectrum of 2,2-dimethoxy-N-(trimethoxysilyloctyl)-1-aza-2-silacyclopentane obtained in Production Example 1.

The obtained reaction liquid was distilled to obtain 66 g of a fraction having a boiling point of 170° C./0.5 kPa (yield: 58%). IR and $^1$H-NMR analyses of the obtained fraction were performed. The results are shown in FIGS. 1 and 2.

Production Example 2

Synthesis of 2-ethoxy-2-methyl-N-(triethoxysilyloctyl)-1-aza-2-silacyclopentane

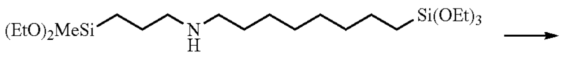

-continued

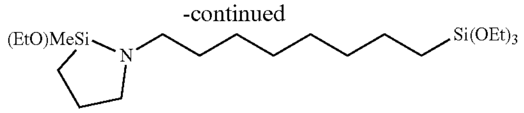

wherein Et represents an ethyl group; and the same applies hereinafter.

The inside of a four-necked glass flask equipped with a stirrer, a thermometer, a distillation tower and a reflux condenser was purged with nitrogen, 162 g (0.348 mol) of (methyldiethoxysilylpropyl)-(triethoxysilyloctyl)amine, 114 g of toluene and 1.0 g (0.0067 mol) of trifluoromethanesulfonic acid were added, and the mixture was refluxed. To this mixture was added 68.5 g (0.382 mol) of N-trimethylsilyl-N-methylaniline, the mixture was stirred, and generated triethylmethoxysilane was taken out together with toluene using a distillation column until the temperature reached a reaction temperature of 150° C.

Figure 3:
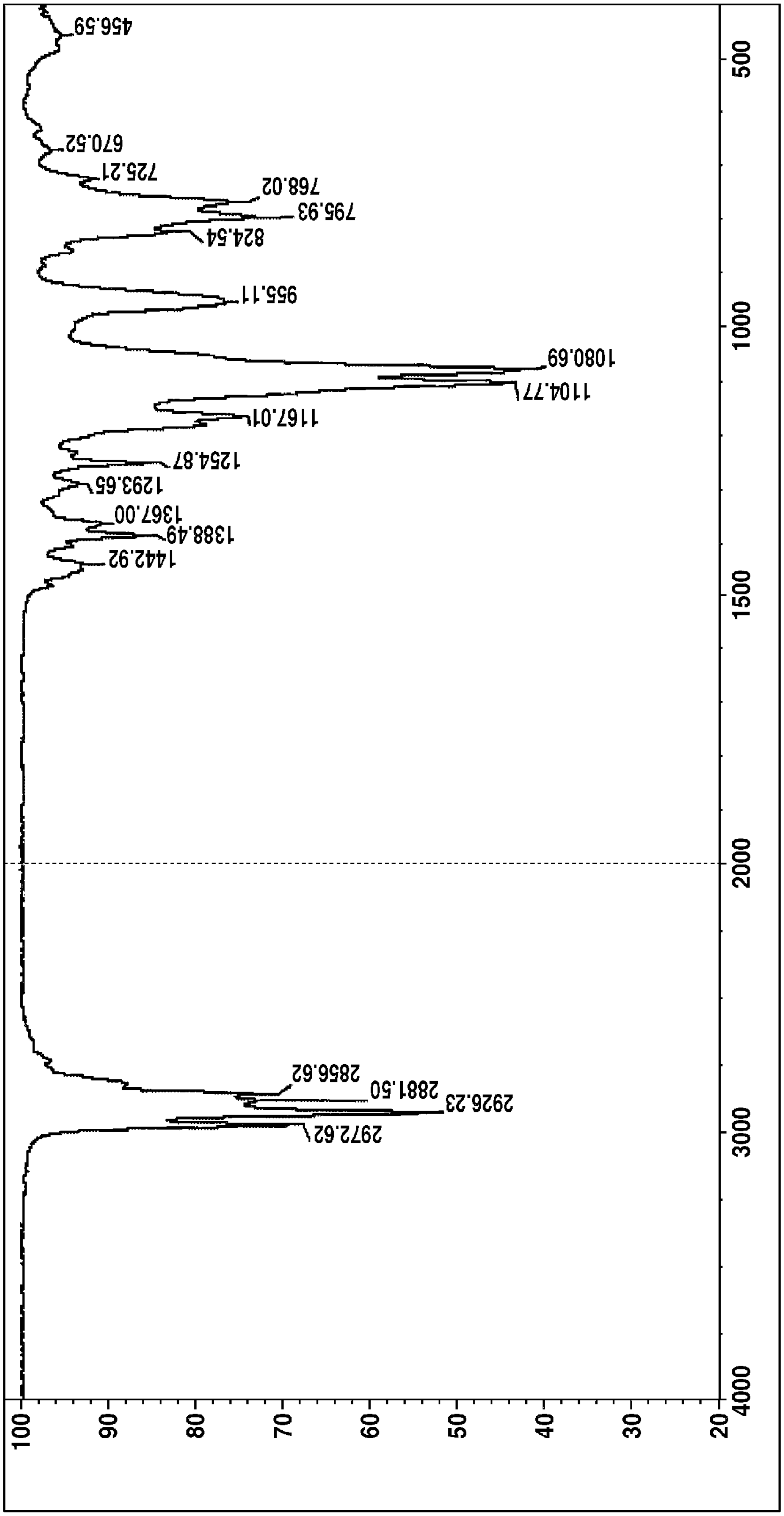
FIG. 3 is a diagram showing an IR spectrum of 2-ethoxy-2-methyl-N-(triethoxysilyloctyl)-1-aza-2-silacyclopentane obtained in Production Example 2.
Figure 4:
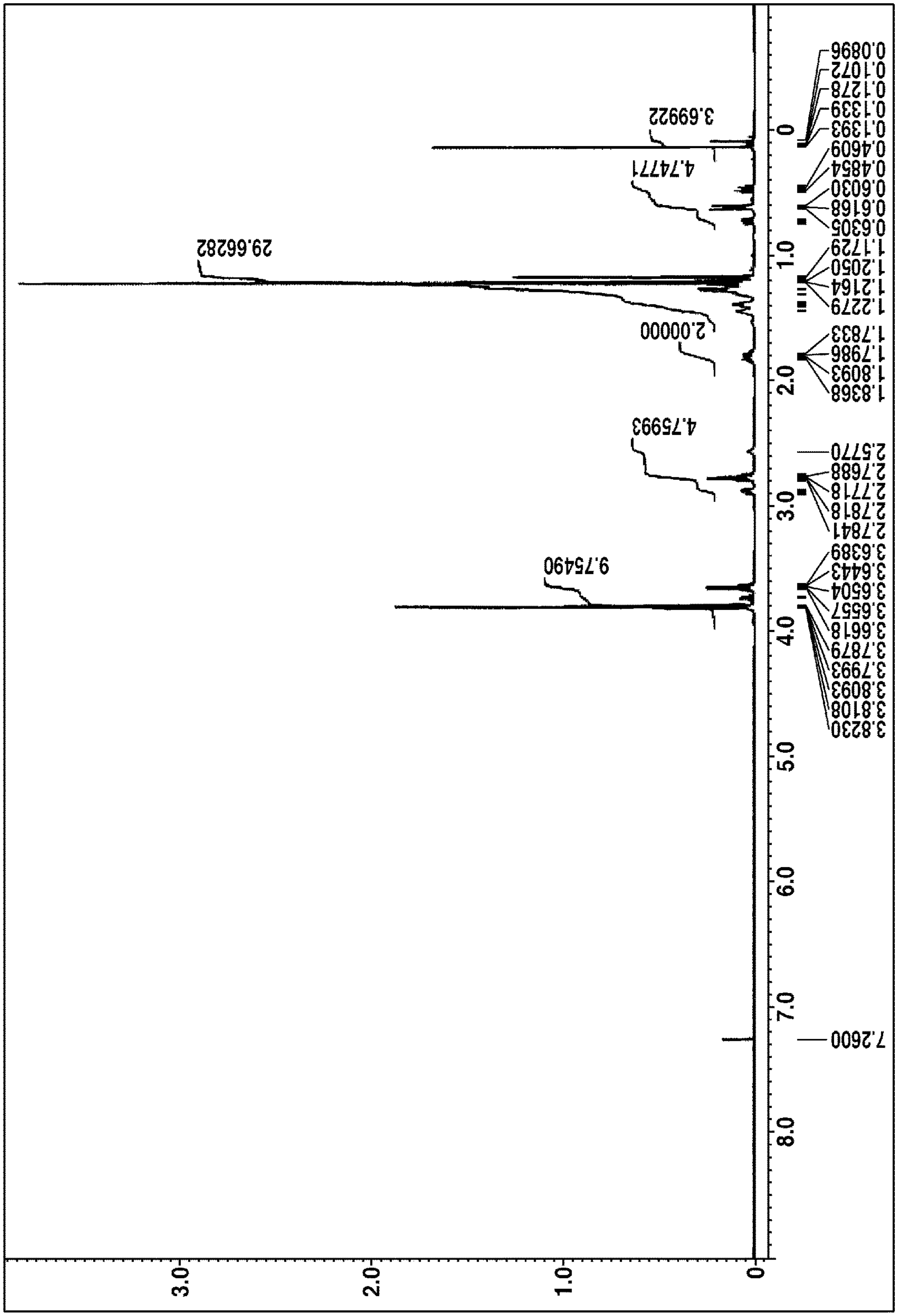
FIG. 4 is a diagram showing a $^1$H-NMR spectrum of 2-ethoxy-2-methyl-N-(triethoxysilyloctyl)-1-aza-2-silacyclopentane obtained in Production Example 2.

The obtained reaction liquid was distilled to obtain 110 g of a fraction having a boiling point of 177° C./0.2 kPa (yield: 75%). IR and $^{1}$H-NMR analyses of the obtained fraction were performed. The results are shown in FIGS. 3 and 4.

Production Example 3

Synthesis of 2-methoxy-2-methyl-N-(trimethoxysilylpropylthioethyl)-1-aza silacyclopentane

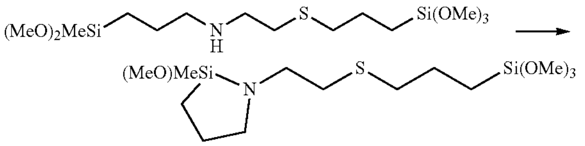

The inside of a four-necked glass flask equipped with a stirrer, a thermometer, a distillation tower and a reflux condenser was purged with nitrogen, 86.0 g (0.221 mol) of (methyldimethoxysilylpropyl)-(trimethoxysilpropylthioethyl)amine, 110 g of toluene and 0.4 g (0.003 mol) of trifluoromethanesulfonic acid were added, and the mixture was refluxed. To this mixture was added 44.0 g (0.245 mol) of N-trimethylsilyl-N-methylaniline, the mixture was stirred, and generated trimethylmethoxysilane was taken out together with toluene using a distillation column until the temperature reached a reaction temperature of 140° C.

Figure 5:
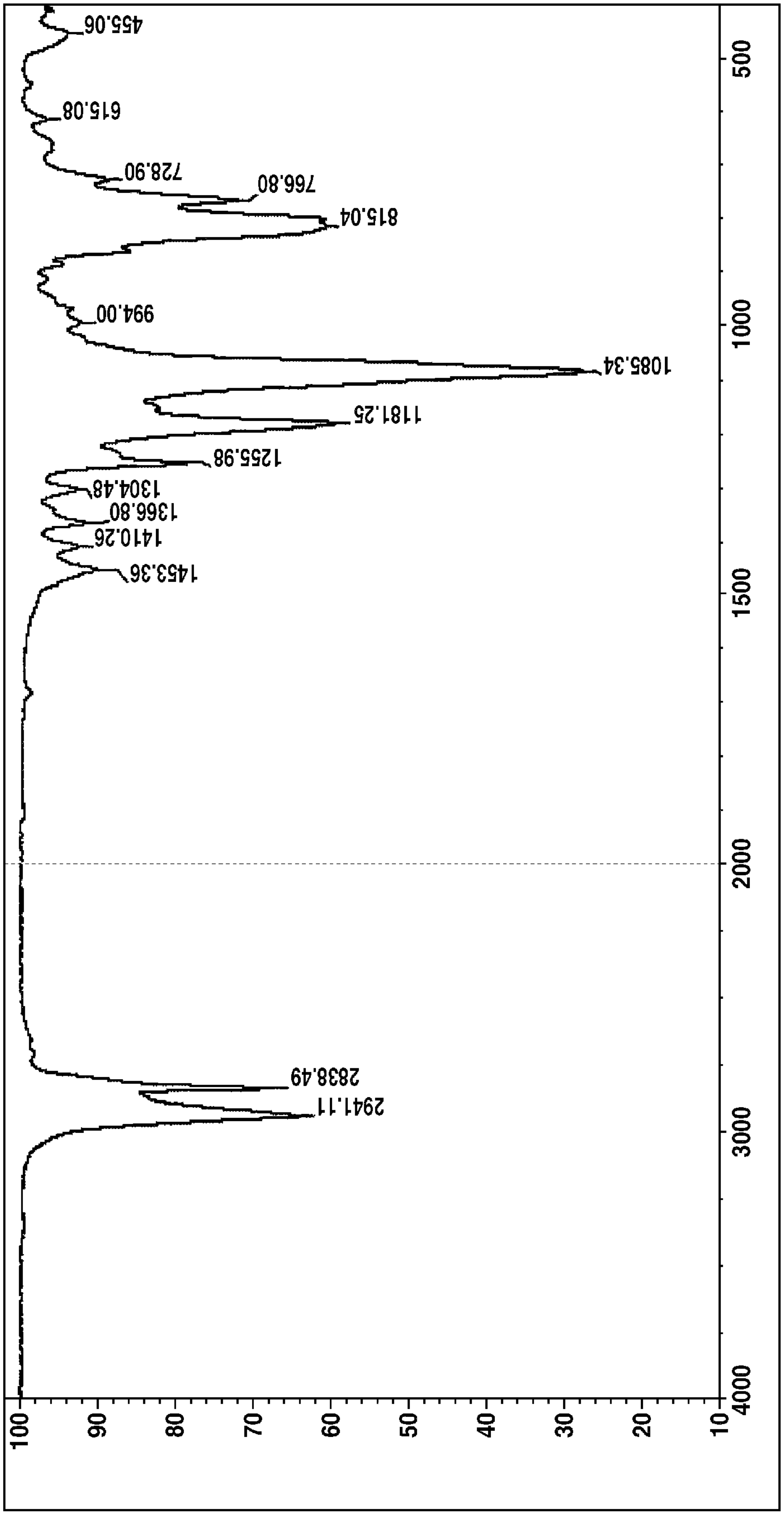
FIG. 5 is a diagram showing an IR spectrum of 2-methoxy-2-methyl-N-(trimethoxysilylpropylthioethyl)-1-aza-2-silacyclopentane obtained in Production Example 3.
Figure 6:
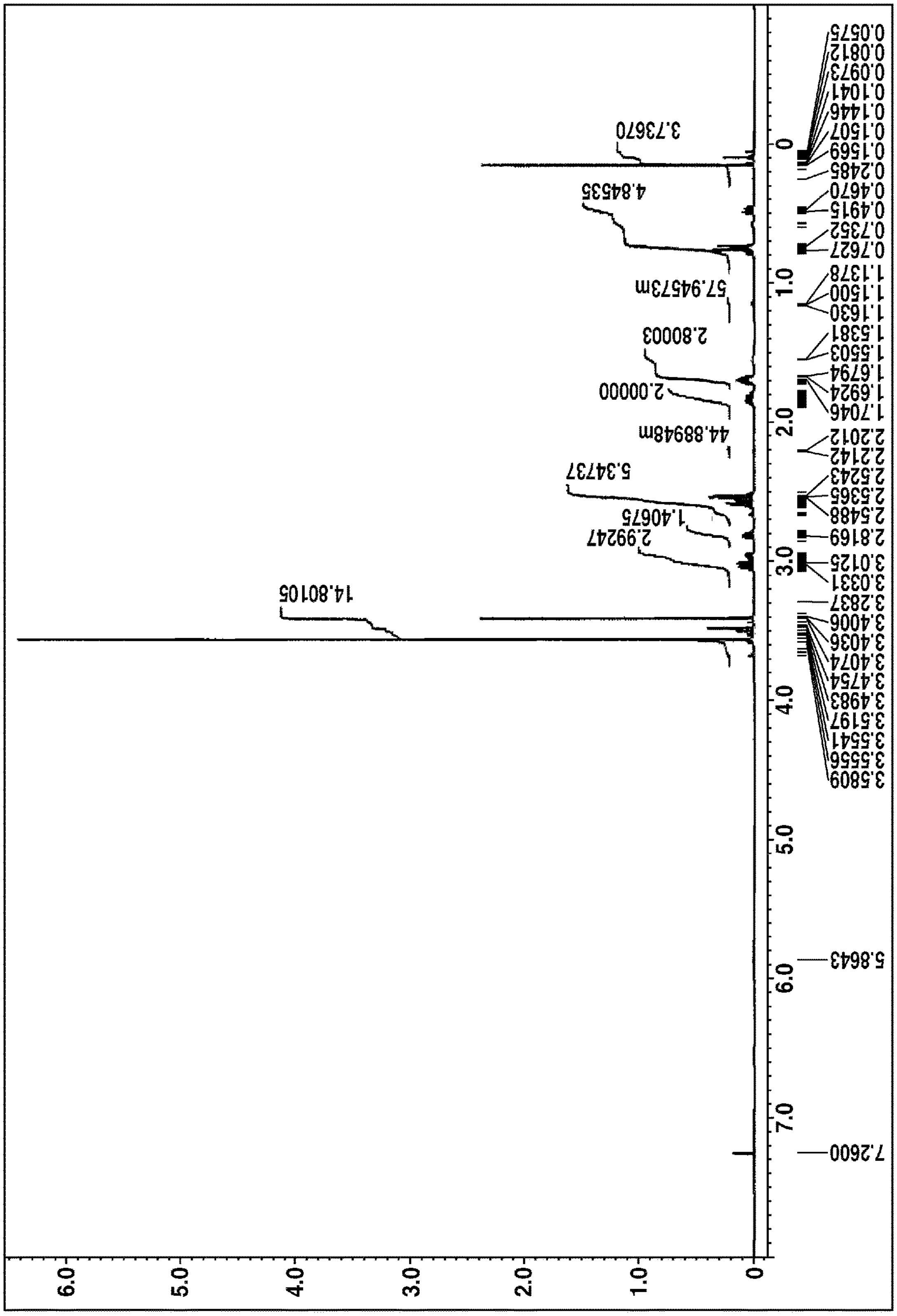
FIG. 6 is a diagram showing a $^1$H-NMR spectrum of 2-methoxy-2-methyl-N-(trimethoxysilylpropylthioethyl)-1-aza-2-silacyclopentane obtained in Production Example 3.

The obtained reaction liquid was distilled to obtain 54 g of a fraction having a boiling point of 140 to 150° C./0.4 kPa (yield: 69%). IR and $^{1}$H-NMR analyses of the obtained fraction were performed. The results are shown in FIGS. 5 and 6.

Synthesis Example 1-1

Synthesis of Polysiloxane Compound Modified at Both Terminals with Alkoxysilylalkylaminopropyl 1

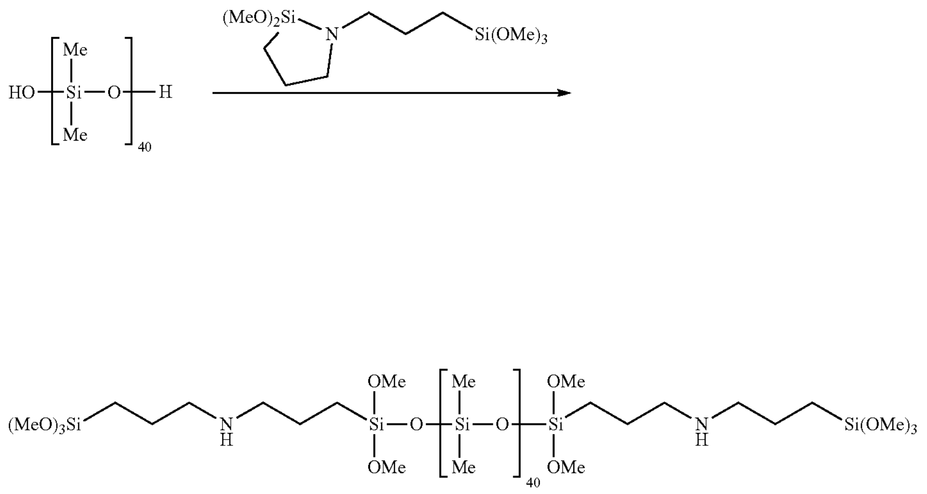

Compound 1

The inside of a four-necked glass flask equipped with a stirrer, a thermometer and a reflux condenser was purged with nitrogen, and charged with 225 g of a silanol-modified polydimethylsiloxane (0.15 mol in terms of silanol) having a numerical average molecular weight of 3000 as determined by gel permeation chromatography (hereinafter, referred to as "GPC"), and the mixture was stirred. To this was added 51.0 g (0.165 mol) of 2,2-dimethoxy-N-trimethoxysilylpropyl-1-aza-2-silacyclopentane was added through a dropping funnel, and the mixture was stirred at room temperature for 1 hour. The reaction liquid was subjected to gas chromatography analysis (hereinafter, referred to as "GC analysis") to confirm disappearance of 2,2-dimethoxy-N-trimethoxysilylpropyl-1-aza-2-silacyclopentane and determine that the reaction was completed. In addition, IR analysis of the product was performed, and the result showed that the peak derived from silanol disappeared.

In this way, 268.5 g of a polysiloxane compound modified at both terminals with an alkoxysilylpropylaminopropyl 1 was obtained as a colorless transparent liquid.

Synthesis Example 1-2

Synthesis of Polysiloxane Compound Modified at Both Terminals with Alkoxysilylalkylaminopropyl 2

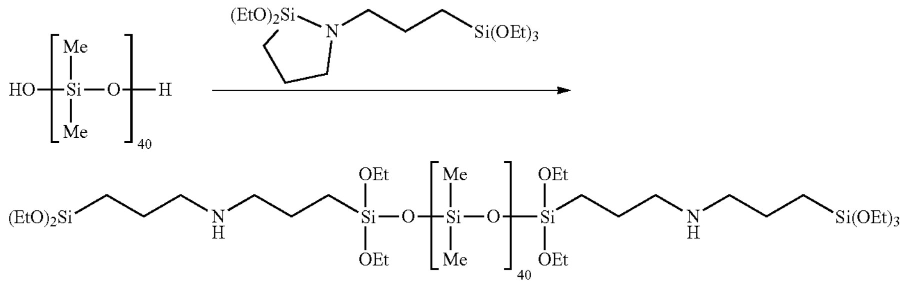

Compound 2

A reaction was carried out in the same manner as in Synthesis Example 1-1 except that 51.0 g of 2,2-dimethoxy-N-trimethoxysilylpropyl-1-aza-2-silacyclopentane was replaced by 63.0 g (0.165 mol) of 2,2-diethoxy-N-triethoxysilylpropyl-1-aza-2-silacyclopentane.

IR analysis of the product was performed, and the result showed that the peak derived from silanol disappeared. 286.5 g of a polysiloxane compound modified at both terminals with an alkoxysilylpropylaminopropyl 2 was obtained as a colorless transparent liquid.

Synthesis Example 1-3

Synthesis of Polysiloxane Compound Modified at Both Terminals with Alkoxysilylalkylaminopropyl 3

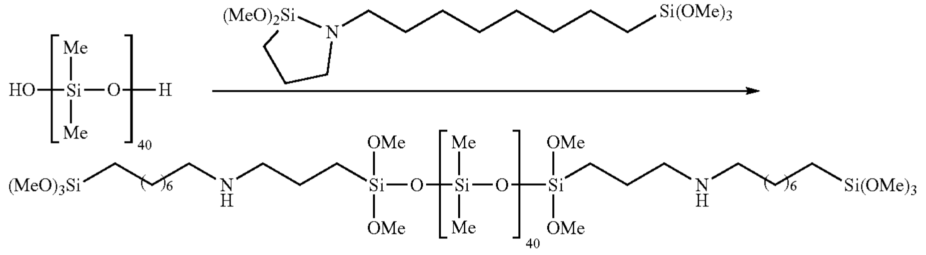

Compound 3

A reaction was carried out in the same manner as in Synthesis Example 1-1 except that the amount of the silanol-modified polydimethylsiloxane used was changed to 15.0 g (0.0100 mol in terms of silanol), and 51.0 g of 2,2-dimethoxy-N-trimethoxysilylpropyl-1-aza-2-silacyclopentane was replaced by 4.1 g (0.011 mol) of 2,2-dimethoxy-N-trimethoxysilyloctyl-1-aza-2-silacyclopentane.

IR analysis of the product was performed, and the result showed that the peak derived from silanol disappeared. 18 g of a polysiloxane compound modified at both terminals with an alkoxysilylalkylaminopropyl 3 was obtained as a colorless transparent liquid.

Synthesis Example 1-4

Synthesis of Polysiloxane Compound Modified at Both Terminals with Alkoxysilylalkylaminopropyl 4

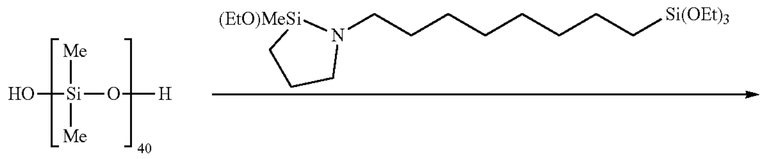

-continued

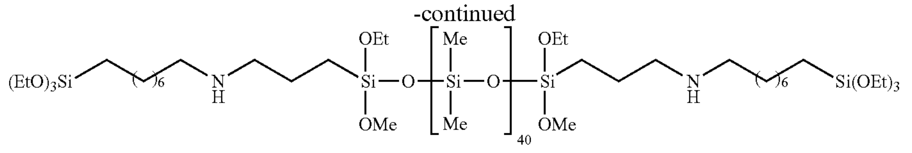

Compound 4

A reaction was carried out in the same manner as in Synthesis Example 1-1 except that the amount of the silanol-modified polydimethylsiloxane used was changed to 15 g (0.010 mol in terms of silanol), and 51.0 g of 2,2-dimethoxy-N-trimethoxysilylpropyl-1-aza-2-silacyclopentane was replaced by 4.8 g (0.011 mol) of 2-ethoxy-2-methyl-N-triethoxysilyloctyl-1-aza-2-silacyclopentane.

IR analysis of the product was performed, and the result showed that the peak derived from silanol disappeared. 19 g of a polysiloxane compound modified at both terminals with an alkoxysilylalkylaminopropyl 4 was obtained as a colorless transparent liquid.

Synthesis Example 1-5

Synthesis of Polysiloxane Compound Modified at Both Terminals with Alkoxysilylalkylaminopropyl 5

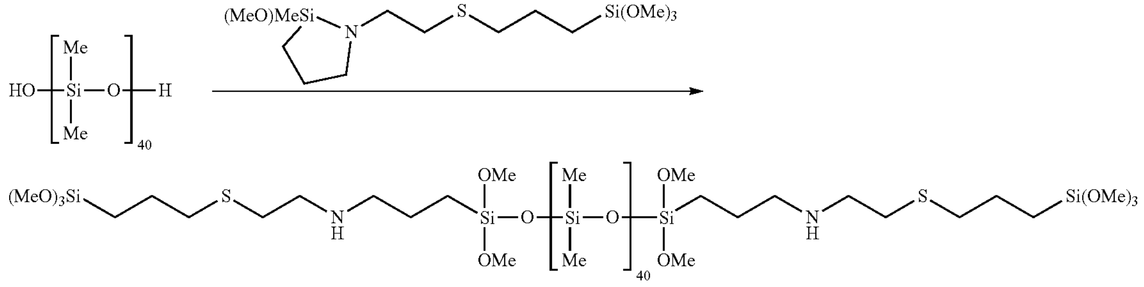

Compound 5

A reaction was carried out in the same manner as in Synthesis Example 1-1 except that the amount of the silanol-modified polydimethylsiloxane used was changed to 15 g (0.010 mol in terms of silanol), and 51.0 g of 2,2-dimethoxy-N-trimethoxysilylpropyl-1-aza-2-silacyclopentane was replaced by 3.9 g (0.011 mol) of 2-methoxy-2-methyl-N-trimethoxysilylpropylthioethyl-1-aza-2-silacyclopentane.

IR analysis of the product was performed, and the result showed that the peak derived from silanol disappeared. 18 g of a polysiloxane compound modified at both terminals with an alkoxysilylpropylaminopropyl 5 was obtained as a colorless transparent liquid.

Synthesis Example 1-6

Synthesis of Polysilazane 2

While the inside of a four-necked glass flask equipped with a stirrer, a gas feed tube, a thermometer and a reflux condenser was purged with nitrogen, so that nitrogen gas was sent to an open end of the upper part of the reflux condenser to prevent ingress of outside air, 148.3 g (0.675 mol) of hexyltrichlorosilane, 29.2 g (0.225 mol) of dimethyldichlorosilane and 700 g of cyclopentylmethyl ether as a solvent were added to obtain a homogeneous solution. This solution was cooled to 10° C. or lower, and ammonia gas was fed into the solution through a feed tube. The feeding of ammonia was continued for 7 hours while the reaction liquid was cooled so that the temperature of the reaction liquid did not exceed 30° C. Thereafter, the feeding of ammonia was stopped, and nitrogen gas was blown through the feed tube for 2 hours to purge the excess ammonia gas. The reaction liquid was filtered, and ammonium chloride was removed to obtain a polysilazane 2.

105 g of an isoparaffin solvent (IP CLEAN LX manufactured by Idemitsu Kosan Co., Ltd., the same applies hereinafter) was added to this reaction liquid to obtain 210.0 g of a colorless transparent solution composition 7 (concentration: 50%).

The obtained composition 7 was subjected to IR analysis, and the result showed that a peak derived from a Si—N—Si structure was present at 922 $cm^{-1}$ and a peak derived from NH was present at 3,370 $cm^{-1}$. In addition, GPC analysis was performed, and the result showed that the weight average molecular weight was 2,700. This indicated that the target polysilazane 2 was produced.

Synthesis Example 1-7

Synthesis of Polysiloxazane

While the inside of a four-necked glass flask equipped with a stirrer, a gas feed tube, a thermometer and a reflux condenser was purged with nitrogen, so that nitrogen gas was sent to an open end of the upper part of the reflux condenser to prevent ingress of outside air, 65.9 g (0.300 mol) of hexyltrichlorosilane, 45.0 g of a polydimethylsiloxane modified at both terminals with silanol, which has a weight average molecular weight of 3,000, and 295.6 g of cyclopentylmethyl ether as a solvent were added, and the mixture was stirred at room temperature for 1 hour. To this were added 42.3 g (0.300 mol) of methylvinyldichlorosilane and 76.8 g of cyclopentyl methyl ether, and the mixture was stirred to obtain a homogeneous reaction liquid. The reaction liquid was cooled to 10° C. or lower, and ammonia gas was fed into the reaction liquid through a feed tube. The feeding of ammonia was continued for 6 hours while the reaction liquid was cooled so that the temperature of the reaction liquid did not exceed 30° C. Thereafter, the feeding of ammonia was stopped, and nitrogen gas was blown through the feed tube for 2 hours to purge the excess ammonia gas. To this reaction liquid, 131.5 g of a sodium hydroxide aqueous solution at 48 wt % was slowly added, and 270.6 g of water was further added. The mixture was stirred at room temperature for 1 hour. Thereafter, the mixture was left standing, and the lower layer was removed. The upper layer was concentrated at 100° C./18 kPa, and then further concentrated at 120° C./4 kPa. Subsequently, 110.9 g of toluene was added to 110.9 g of the obtained concentrate, and the mixture was filtered through a 1 μm membrane filter to obtain 219.6 g of a colorless transparent solution.

Subsequently, the inside of a four-necked glass flask equipped with a stirrer, a thermometer, a reflux condenser and dropping funnel was purged with nitrogen, and charged with 16.9 g (0.086 mol) of mercaptopropyltrimethoxysilane and 16.9 g of toluene, and the mixture was heated to 90° C. To this, a mixture of 80.0 g of the colorless transparent solution obtained as described above and 0.168 g (0.000874 mol) of 2,2'-azobis(2-methylbutyronitrile) was added through a dropping funnel over 2.5 hours, and the mixture was stirred for 1 hour while the same temperature was maintained, thereby obtaining a polysiloxazane.

To the obtained polysiloxazane 1 was added 60.0 g of an isoparaffin solvent, and the mixture was concentrated at 100° C./15 kPa, and then further concentrated at 100° C./4 kPa. The nonvolatile content of the obtained reaction liquid was measured under the condition of 105° C./3 hours using an infrared moisture meter (FD-720 manufactured by Kett Electric Laboratory.), and the result showed that the nonvolatile content was 53.8%. 7.5 g of an isoparaffin solvent was added to the reaction liquid to adjust the nonvolatile content to 50%, thereby obtaining a composition 1.

The obtained composition 1 was subjected to IR analysis, and the result showed that peaks derived from a Si—N—Si structure were present at 932 $cm^{-1}$ and 1,190 $cm^{-1}$, a peak derived from Si—O—Si was present at 1,092 $cm^{-1}$, and a peak derived from NH was present at 3,391 $cm^{-1}$. In addition, GPC analysis was performed, and the result showed that the weight average molecular weight was 5,300. This indicated that the target polysiloxazane was produced.

The compounds used in Examples and Comparative Examples below are shown below.

(1) Alkoxysilylalkylaminoalkyl-Modified Polysiloxane Compound

Amino-modified polysiloxane compound having alkoxysilylalkyl:

alkoxysilylpropylaminopropyl-modified polysiloxane compounds 1 to 5 (referred to as compounds 1 to 5)

Amino-modified polysiloxane compound having no alkoxysilylalkyl group:

X-22-161B (manufactured by Shin-Etsu Chemical Co., Ltd.)

(2) Hydrolyzable Group-Containing Organosilicon Compound

KR-500: a hydrolyzable silicone compound having a methyl group and a methoxy group (manufactured by Shin-Etsu Chemical Co., Ltd.)

X-40-9227: a hydrolyzable silicone compound having a methyl group, a phenyl group and a methoxy group (manufactured by Shin-Etsu Chemical Co., Ltd.)

KR-400: a mixture of a hydrolyzable silicone compound having a methyl group and a methoxy group and a curing catalyst (manufactured by Shin-Etsu Chemical Co., Ltd.)

Ethyl Silicate 40: partial hydrolytic condensate of tetraethoxysilane (manufactured by COLCOAT CO., LTD.)

Polysilazane 1: a reaction product of a polysilazane compound having a methyl group and a hydrogen atom with aminopropyltriethoxysilane (HTA-1500 RC manufactured by Sanwa Kagaku Corp.)

Polysilazane 2: polysilazane obtained in Synthesis Example 1-6

Polysiloxazane: polysiloxazane obtained in Synthesis Example 1-7

(3) Solvent

IP CLEAN LX: an isoparaffin solvent (manufactured by Idemitsu Kosan Co., Ltd.)

(4) Curing Catalyst

DX-9740: an aluminum compound (manufactured by Shin-Etsu Chemical Co., Ltd.)

D-25: Titanium compound (manufactured by Shin-Etsu Chemical Co., Ltd.)

Examples 1-1 to 1-8 and Comparative Examples 1-1 to 1-5

The polysiloxane compound modified at both terminals with an alkoxysilylalkylamino, which had been obtained in Synthesis Example 1-1, the hydrolyzable group-containing organosilicon compound, the solvent and the curing catalyst were mixed at a ratio as shown in Table 1 below while ingress of moisture was prevented, thereby preparing a curable composition. The curing time and the contact angle were measured by the following method. The results are shown in Table 1.

[Curing Time]

Each curable composition was applied onto a polished steel plate (10 cm×15 cm) with a bar coater to a wet thickness of 30 μm, and then left standing in an environment at 25° C. and 50% relative humidity. Thereafter, a finger was pressed against the coated surface of the test piece every 30 minutes, and the time until finger marks were no longer left (drying time by finger touch, tack free time) was measured, and taken as a curing time.

[Contact Angle]

Each curable composition was applied onto an aluminum plate (10 cm×15 cm) with a bar coater to a wet thickness of 30 μm, and then left standing in an environment at 25° C. and 50% relative humidity for 2 hours. After curing, the applied composition was further left standing at room temperature for 24 hours, and for the obtained cured film, the water contact angle at 2 μL was measured at room temperature using a contact angle meter (manufactured by Kyowa Interface Science Co., Ltd.).

TABLE 1

| | | Aminoalkyl-modified polysiloxane compound (pbw) | | Hydrolyzable group-containing organosilicon compound (pbw) | | | | Solvent (pbw) IP CLEAN | Curing catalyst (pbw) | | Curing time | Contact angle |
|---|---|---|---|---|---|---|---|---|---|---|---|---|
| | | Compound 1 | X-22-161B | KR-500 | Poly-silazane 1 | Poly-silazane 2 | Poly-siloxazane | LX | DX-9740 | D-25 | (hours) | (°) |
| Example | 1-1 | 100 | | 100 | | | | | | | 4 | 92 |
| | 1-2 | 100 | | 100 | | | | | 10 | | <0.5 | 107 |
| | 1-3 | 100 | | 100 | | | | | | 10 | <0.5 | 107 |
| | 1-4 | 10 | | 100 | | | | | 5.5 | | 3 | 105 |
| | 1-5 | 1 | | 100 | | | | | 5.05 | | 4 | 101 |
| | 1-6 | 100 | | | 100 | | | | | | 1 | 106 |
| | 1-7 | 100 | | | | 100 | | 100 | | 10 | <0.5 | 107 |
| | 1-8 | 100 | | | | | 100 | 100 | | 10 | <0.5 | 107 |
| Comparative Example | 1-1 | | 100 | 100 | | | | | | | Not cured | Measurement impossible |
| | 1-2 | | 100 | 100 | | | | | 10 | | 4 | 87 |
| | 1-3 | | 10 | 100 | | | | | 5.5 | | 5 | 104 |
| | 1-4 | | 30 | | 100 | | | | | | Not cured | Measurement impossible |
| | 1-5 | | 100 | | | 100 | | 100 | | 10 | Not cured | Measurement impossible |

As shown in Table 1, curable compositions containing the compound 1 according to the present invention which has an alkoxysilylalkyl group on nitrogen were capable of forming a cured film regardless of the presence or absence of a curing catalyst, and had a high contact angle, so that a high water-repellent property was exhibited.

On the other hand, curable compositions containing an aminopropyl-modified polysiloxane compound having no alkoxysilylalkyl group on nitrogen did not form a cured film.

Examples 2-1 to 2-6

The polysiloxane compound modified at both terminals with an alkoxysilylalkylamino, which had been obtained in each of Synthesis Examples, the hydrolyzable group-containing organo silicon compound, the solvent and the curing catalyst were mixed at a ratio as shown in Table 2 below while ingress of moisture was prevented, thereby preparing a curable composition. The curing time and the contact angle were measured in the same manner as described above. The results are shown in Table 2.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A curable composition comprising an alkoxysilylalkylaminopropyl-modified polysiloxane compound of the following general formula (1) and a hydrolyzable group-containing organosilicon compound:

(1)

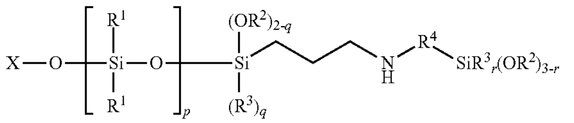

TABLE 2

| | | Aminoalkyl-modified polysiloxane compound (pbw) Compound | | | | | Hydrolyzable group-containing organosilicon compound (pbw) | | | | Curing catalyst (pbw) | Curing time | Contact angle |
|---|---|---|---|---|---|---|---|---|---|---|---|---|---|
| | | 1 | 2 | 3 | 4 | 5 | KR-500 | X-40-9227 | KR-400 | Ethyl Silicate 40 | DX-9740 | (hours) | (°) |
| Example | 2-1 | 100 | | | | | | 100 | | | 10 | <0.5 | 98 |
| | 2-2 | 100 | | | | | | | 100 | | | <0.5 | 108 |
| | 2-3 | | 100 | | | | | | | 100 | 10 | <0.5 | 106 |
| | 2-4 | | | 100 | | | 100 | | | | 10 | 1 | 108 |
| | 2-5 | | | | 100 | | | | | 100 | 10 | 1.5 | 106 |
| | 2-6 | | | | | 100 | 100 | | | | 10 | 3 | 98 |

As shown in Table 2, curable compositions containing the aminopropyl-modified polysiloxane according to the present invention which has an alkoxysilylalkyl group on nitrogen were capable of forming a cured film, and had a high contact angle, so that a high water-repellent property was exhibited.

Japanese Patent Application No. 2021-158826 is incorporated herein by reference.

wherein $R_1$s each independently represent a substituted or unsubstituted monovalent hydrocarbon group having 1 to 10 carbon atoms, $R^2$ and $R^3$ each independently represent an unsubstituted monovalent hydrocarbon group having 1 to 6 carbon atoms, $R^4$ represents a divalent hydrocarbon group having 1 to 20 carbon atoms, which may contain a sulfur atom, a silicon atom, or a urea bond, with the proviso that $R^4$ does not include methylene group is an integer of 1 to 1000, q is 0 or 1, r is 0, 1 or 2, and X represents a group of the following general formula (2) or $R^1{}_3Si$:

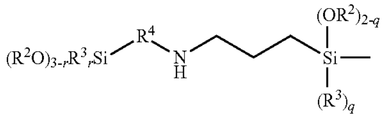

(2)

wherein $R^2$ to $R^4$, q and r represent the same meaning as described above.

2. The curable composition according to claim 1, wherein the hydrolyzable group-containing organosilicon compound is at least one selected from the group consisting of an alkoxysilane, a partial hydrolytic condensate of an alkoxysilane, a polysilazane and a polysiloxazane.

3. The curable composition according to claim 1, comprising a solvent.

4. The curable composition according to claim 1, comprising at least one metal compound selected from the group consisting of a titanium compound, an aluminum compound, a zinc compound and a tin compound.

5. A cured product of the curable composition according to claim 1.

6. A covered substrate comprising a substrate, and a film formed on the substrate, the film being formed from the curable composition according to claim 1.

7. The curable composition according to claim 2, comprising a solvent.

8. The curable composition according to claim 2, comprising at least one metal compound selected from the group consisting of a titanium compound, an aluminum compound, a zinc compound and a tin compound.

9. A cured product of the curable composition according to claim 2.

10. A covered substrate comprising a substrate, and a film formed on the substrate, the film being formed from the curable composition according to claim 2.

* * * * *